(12) United States Patent
Kumagai et al.

(10) Patent No.: US 6,731,959 B1
(45) Date of Patent: May 4, 2004

(54) PORTABLE TELEPHONE SET WITH HINGED LID

(75) Inventors: Masashi Kumagai, Kanagawa (JP); Susumu Otsuki, Kanagawa (JP); Mamoru Yoshida, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/150,387

(22) Filed: Sep. 9, 1998

(30) Foreign Application Priority Data

Sep. 10, 1997 (JP) .............................. 9-245508

(51) Int. Cl.[7] .......................... H04Q 7/32; H04M 1/03
(52) U.S. Cl. ................. 455/575.3; 455/566; 455/569.1
(58) Field of Search ................................ 455/575, 550, 455/566, 569, 90, 347, 351, 575.3, 569.1; 379/433.13, 433.03, 433.07

(56) References Cited

U.S. PATENT DOCUMENTS 5,751,804 A * 5/1998 Mendolia ............... 379/433.13
5,867,795 A * 2/1999 Novis et al. ................ 455/566
5,933,783 A * 8/1999 Kawakami et al. ..... 455/575 X
5,937,360 A * 8/1999 Nishiyama et al. ......... 455/566
6,002,945 A * 12/1999 McDuffe .................... 455/556

FOREIGN PATENT DOCUMENTS

EP          0827360 A1 *  4/1998    ........... H04R/1/40
JP          4-273639       9/1992

* cited by examiner

Primary Examiner—Nay Maung
Assistant Examiner—Philip J. Sobutka
(74) Attorney, Agent, or Firm—Pearne & Gordon LLP (57) ABSTRACT

A simple portable telephone set with which the user can talk over the telephone without opening its lid. The simple portable telephone set includes: a telephone set body (15) having a key operating section (13); a liquid crystal section (12) provided in the telephone set body (15); a transmitter section (14) provided on a side surface of the telephone set body (15); an opening and closing lid (17) swingably coupled to the telephone set body (15); a receiver section (19) provided on the inner surface of the lid (17); and a sound generating section (21) provided on an outer surface of the lid (17).

18 Claims, 7 Drawing Sheets

PORTABLE TELEPHONE SET WITH HINGED LID

BACKGROUND OF THE INVENTION

1. Field of the Invention

This invention relates to a simple portable telephone set (a cellular phone) in which its telephone set body has an opening and closing cover, and which is used mainly outdoors.

2. Description of the Related Art

Figure 6:
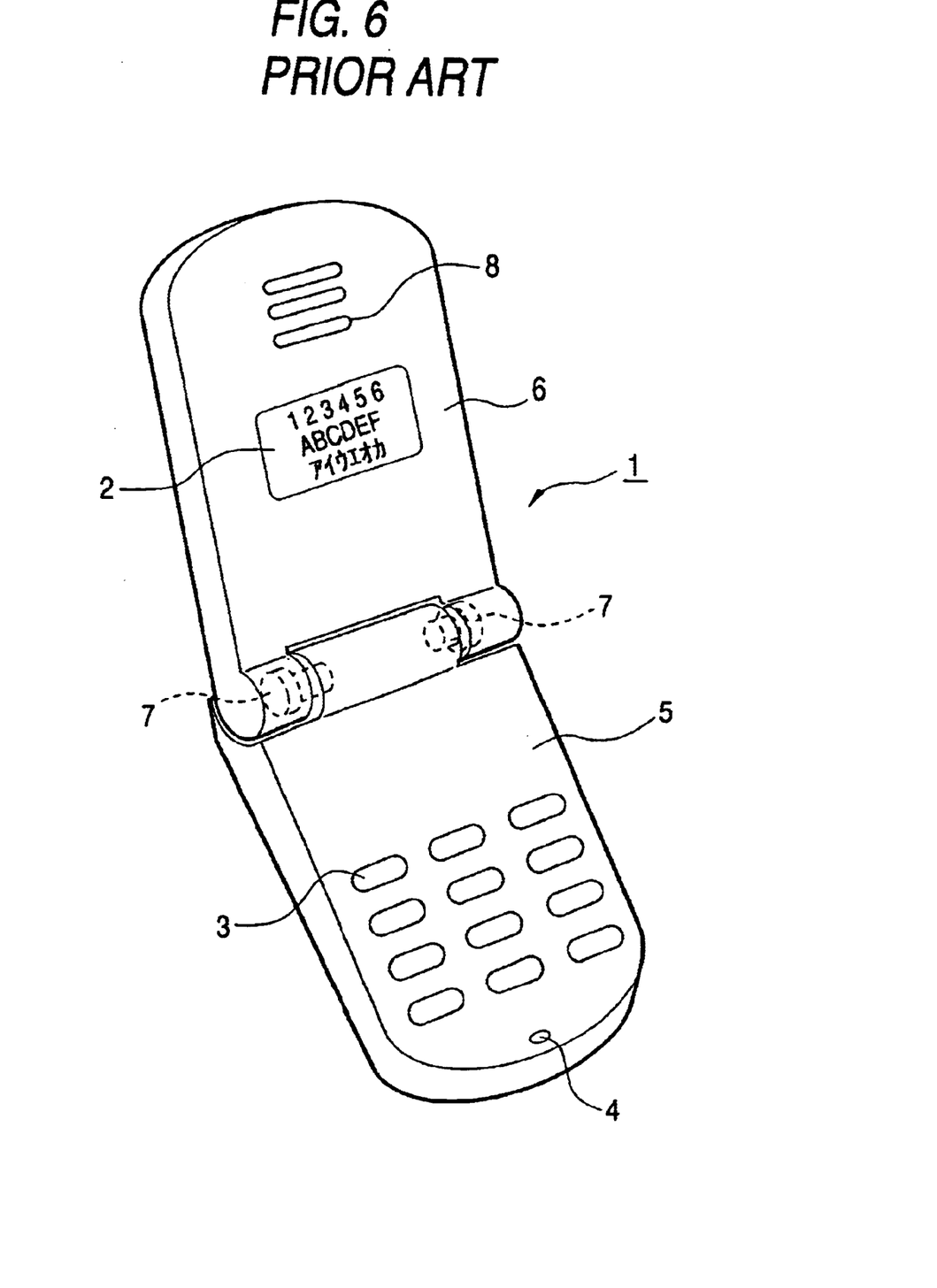
FIG. 6 is a perspective view showing the external appearance and construction of a typical simple portable telephone set, which is a related art of the present invention.
Figure 7:
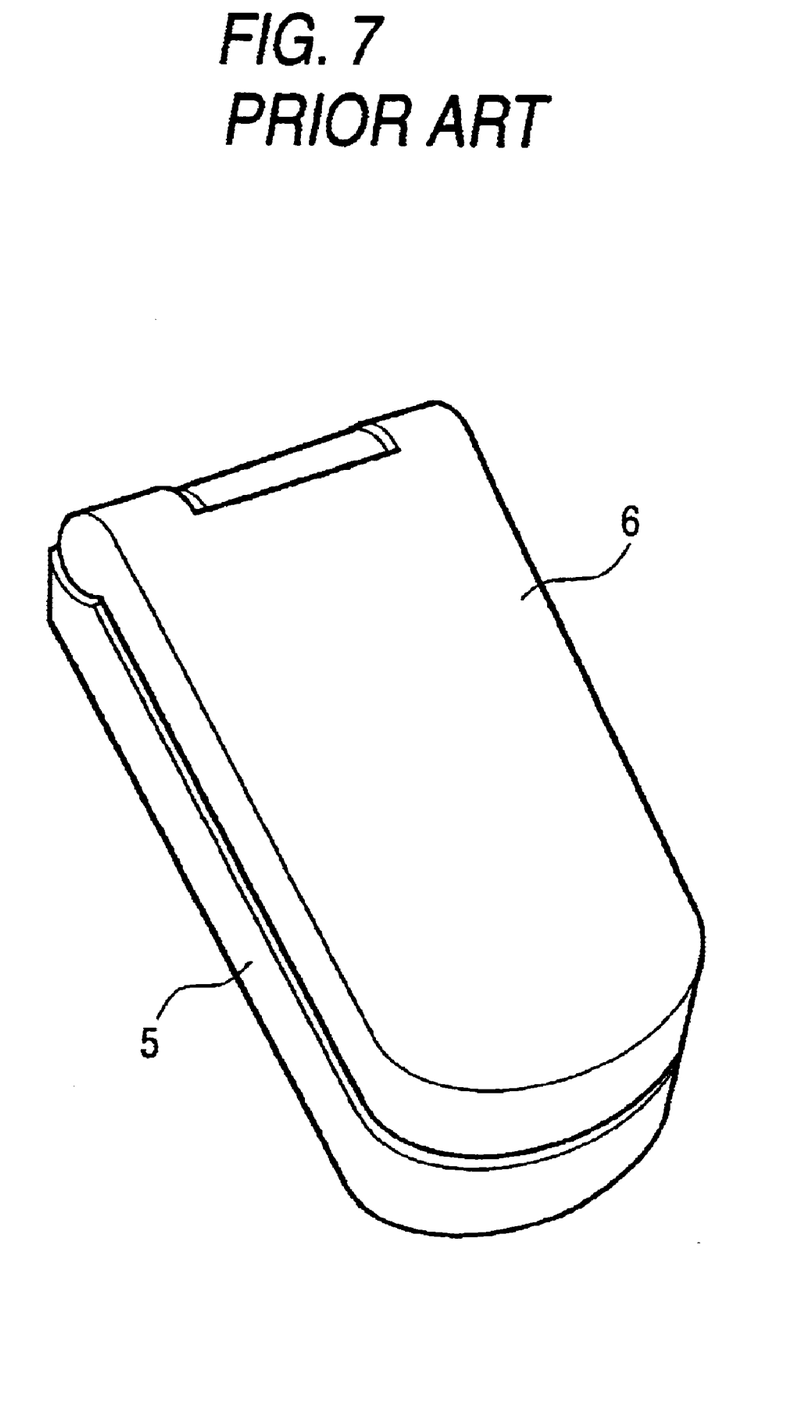
FIG. 7 is a perspective view showing the typical simple portable telephone set which is waiting for a calling signal.

A typical simple portable telephone set will be described with reference to FIGS. 6 and 7. FIG. 6 is a perspective view showing the external appearance of the simple portable telephone set, and FIG. 7 is also a perspective view showing the simple portable telephone set which is waiting for a calling signal. In those figures, reference numeral 1 designates the simple portable telephone set for calls through an external antenna (not shown); 2, a liquid crystal section on which, for instance, the telephone number of an addressee is displayed; 3, a key operating section; 4, a transmitter section including an ECM microphone or the like for inputting sounds or voices to be transmitted to a transmitter; 5, a telephone set body including the liquid crystal section 2, the key operating section 3, and the transmitter section 4; 6, a closable lid which is coupled to the telephone set body 5 in such a manner that it is swingable about a shaft 7; and 8, a receiver section including a speaker of the like, provided in the lid 6, for outputting received signals as sounds.

Now, the operation of the simple portable telephone set will be described. The simple portable telephone set is generally used as follows: An addresser or addressee opens the lid 6 and talks over the telephone set with the receiver section put on the ear. After the talk over the telephone set is ended, the lid 6 is closed so that the telephone set is awaiting calling signals again.

With the simple portable telephone set thus designed, during the talks over the telephone set, it is necessary to bring the ear into close contact with the receiver section speaker, and bring the mouth near to the transmitter section microphone. That is, the lid must be kept open during the talks over the telephone set, and in other words, the talks over the telephone set with the lid closed is impossible.

This is a problem to be solved by the invention. That is, an object of the invention is to provide a simple portable telephone set over which enables the talks with the lid held closed.

SUMMARY OF THE INVENTION

The foregoing object of the invention has been achieved by the provision of a simple portable telephone set which, according to the invention, comprises:

a telephone set body having a key operating section;

a liquid crystal section provided in said telephone set body;

a transmitter section provided on the side surface of the telephone set body;

an opening and closing lid which is swingably coupled to the telephone set body:

a receiver section provided on the inner surface of the lid; and a sound generating section provided on the outer surface of the lid.

With the telephone set of the invention, the user can talk over the telephone regardless of whether the lid is open or closed.

DETAILED DESCRIPTION OF THE PREFERRED EMBODIMENTS

Preferred embodiments of the invention will be described with reference to the accompanying drawings.

First Embodiment

Figures 1A, 1B:
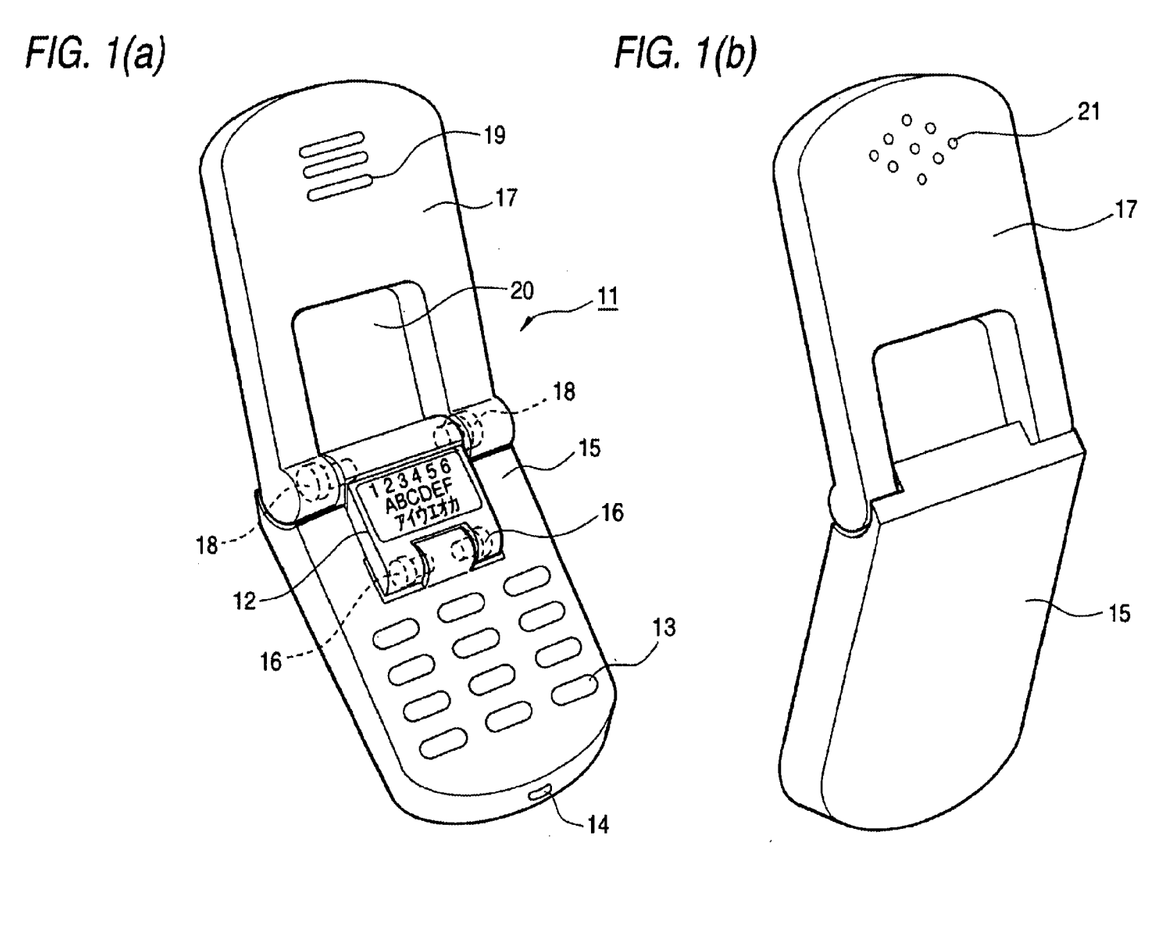
FIGS. 1(a) and 1(b) are perspective views showing the external appearance and construction of an example of a simple portable telephone set, which constitutes a first embodiment of the invention.

FIGS. 1(a) and 1(b) are perspective views, each showing the external appearance and construction of an example of a simple portable telephone set, which constitutes a first embodiment of the invention. More specifically, FIG. 1(a) is a perspective view showing its using side, and FIG. 1(b) is a perspective view showing its rear side.

In FIGS. 1(a) and 1(b), reference numeral 11 designates the simple portable telephone set for calls through an external antenna (not shown); 12, a liquid crystal section which displays, for instance, the telephone number of an addressee; 13, a key operating section; 14, a transmitter section for inputting sounds or voice to be transmitted to a transmitter including an ECM microphone etc.; and 15, a telephone set body including the liquid crystal section 12, the key operating section 13, and the transmitter section 14. The liquid crystal section 12 is coupled to the telephone set body 15 in such a manner that it is swingable about a shaft 16. Reference numeral 17 designates an opening and closing lid which is coupled to the telephone set body 15 in such a manner that it is swingable about a shaft 18. Reference numeral 19 designates a receiver section, provided in the lid 17, for outputting received signals as sounds. Reference numeral 20 designates a window which is formed through the lid 17. When the lid is closed, the window 20 is engaged with the liquid crystal section 12 to expose the liquid crystal section 12. Reference numeral 21 denotes a sound generating section which is provided behind the receiver section 19.

Figure 2:
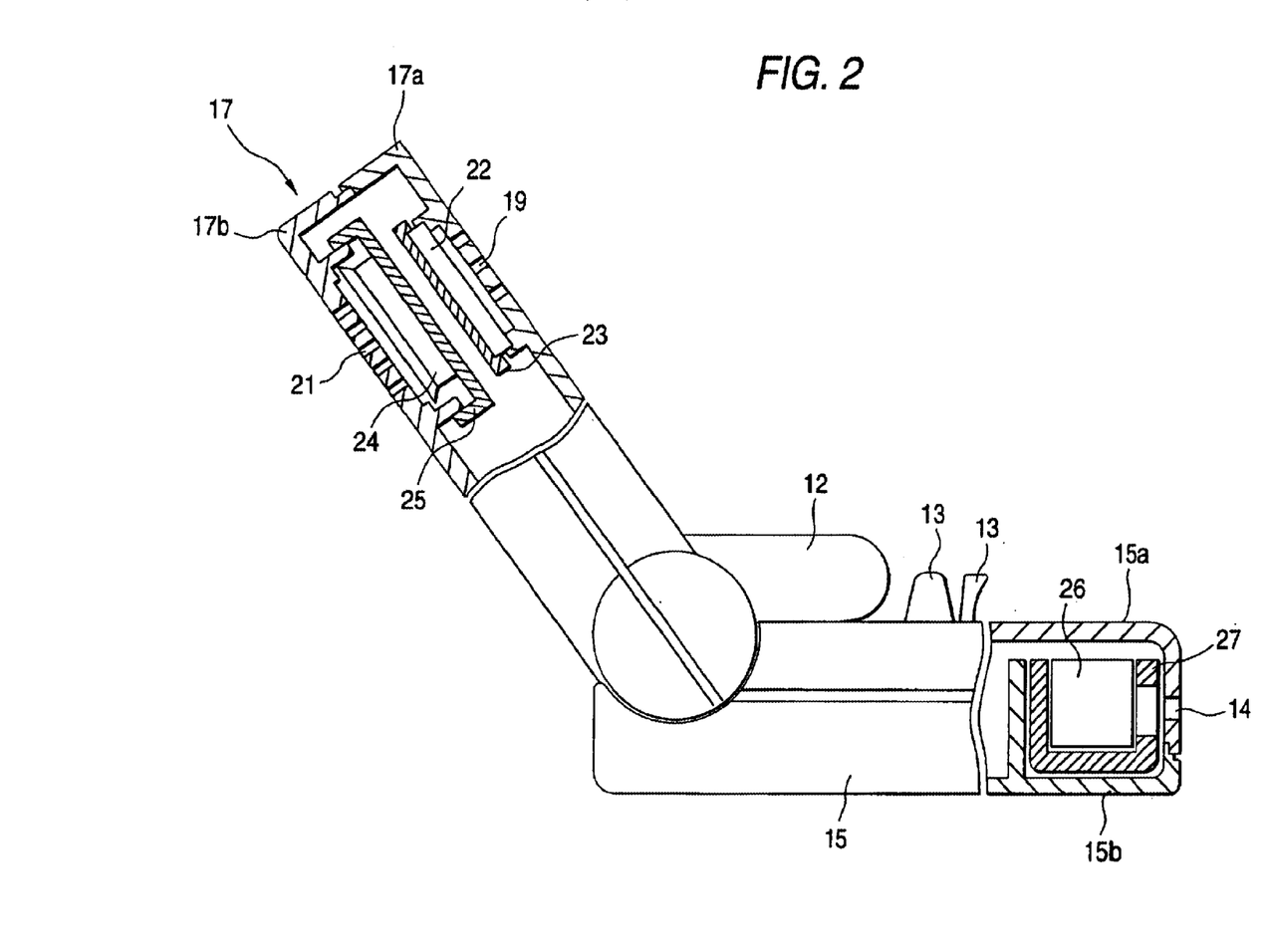
FIG. 2 is a sectional side view, with parts cut away, showing the internal structure of the simple portable telephone set according to the first embodiment of the invention.

The internal structure of the above-described simple portable telephone set 11 will be described with reference to FIG. 2. As shown in FIG. 2, the lid 17 is made up of a lid inner casing 17a and a lid outer casing 17b. A speaker 22 is mounted on the lid inner casing 17a through a speaker holder 23, whereas a speaker 24 is mounted on the lid outer casing 17b through a speaker holder 25. The speakers 22, 24 are connected to an electrical control board, and both generate received signals as sounds. On the other hand, the casing of the telephone set body 15 is made up of a body inner casing 15a and a body outer casing 15b. The transmitter section 14 is provided on the side surface of the body inner casing 15a. A microphone 26 is mounted on the body outer casing 15b through a microphone holder 27. The microphone 26 is connected to the electrical control board (not shown) to transmit sounds as transmitting signals.

Now, the functions of the simple portable telephone set will be described.

(1) First Function

Figure 3:
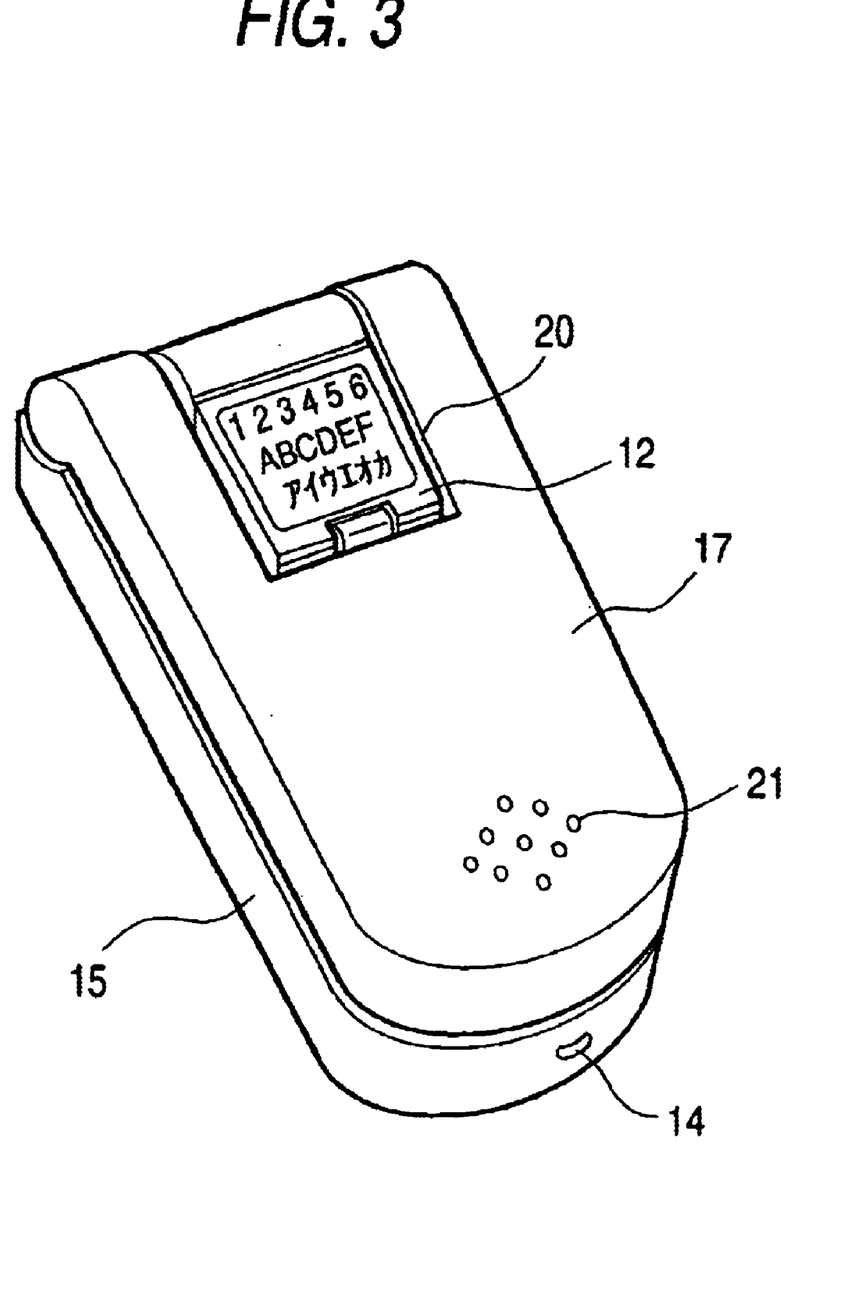
FIG. 3 is a perspective view for description of first and second functions of the simple portable telephone set according to the first embodiment of the invention.

In the case where the lid is closed as shown in FIG. 3, sounds from the other calling party is outputted by the speaker 24 externally through the sound generating or second receiver section 21, and sounds from the user is inputted through the transmitter section 14 to the microphone 26 provided on the side surface of the telephone set body 15. Hence, the talks over the telephone set is possible even in the case where the lid 17 is closed.

If the call to the other party is required, the user operates the key operating section 13, and after the other party answers the call, the lid may be closed and the telephone set may be set hear the user. That is, the talks over the telephone set is possible without holding the telephone set.

(2) Second Function

Even if the lid 17 is closed, the liquid crystal section 12 is exposed appearing in the window 20. Hence, the user can observe the liquid crystal section 12 at all times regardless of whether the lid 17 is closed or open.

(3) Third Function

Figure 4A:
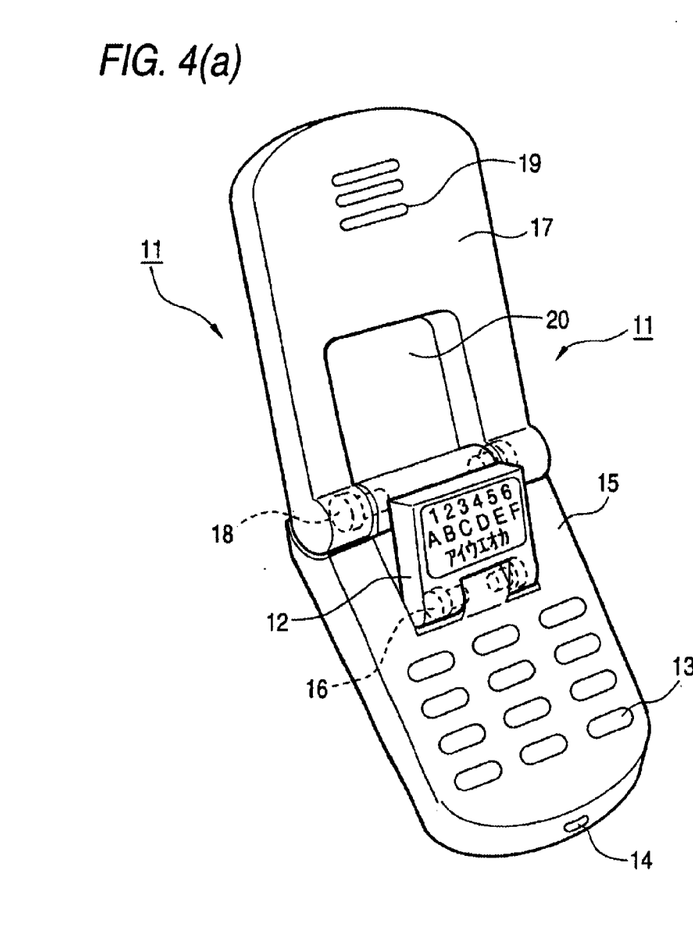
FIGS. 4(a) and 4(b) are perspective views for description of third function of the simple portable telephone set according to the first embodiment of the invention.
Figure 4B:
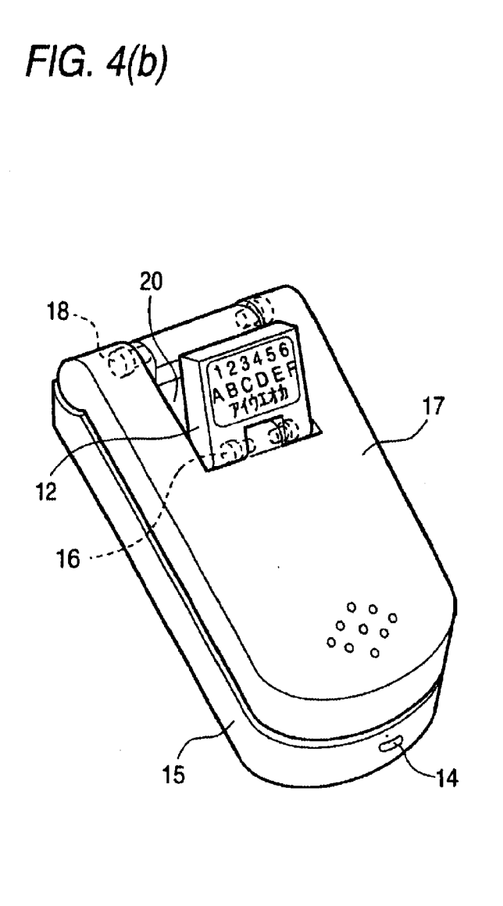

The liquid crystal section 12 is swingably mounted on the telephone set body. Therefore, as shown in FIG. 4(a), it may be raise to an angle with which the user can readily observe the liquid crystal section 12. Furthermore, with the liquid crystal section 12 held at this angle, the lid 17 can be closed as shown in FIG. 4(b). That is, the liquid crystal section 12 may be swung regardless of whether the lid 17 is open or closed.

As is apparent from the above description, the simple portable telephone set of the invention is advantageous in that, even if the lid is held closed, the sound of the other calling party is outputted through the sound generating section 21 provided in the outer surface of the aforementioned lid, while the sound of the user is inputted through the transmitter section 14. Hence, with the lid closed, the user can talk over the telephone; and furthermore he can talk over the telephone without holding the telephone set with his hand.

Even when the lid is closed, the liquid crystal section is fitted in the window formed in the lid, thus being exposed outside. Hence, the user can observe the liquid crystal section regardless of whether the lid is closed or open. Furthermore, the liquid crystal section is swingable as was described above. Therefore, the liquid crystal section can be swung upwardly and set at a suitable angular position to observe it, and the lid can be closed with the liquid crystal section set in this way.

Second Embodiment

Figure 5:
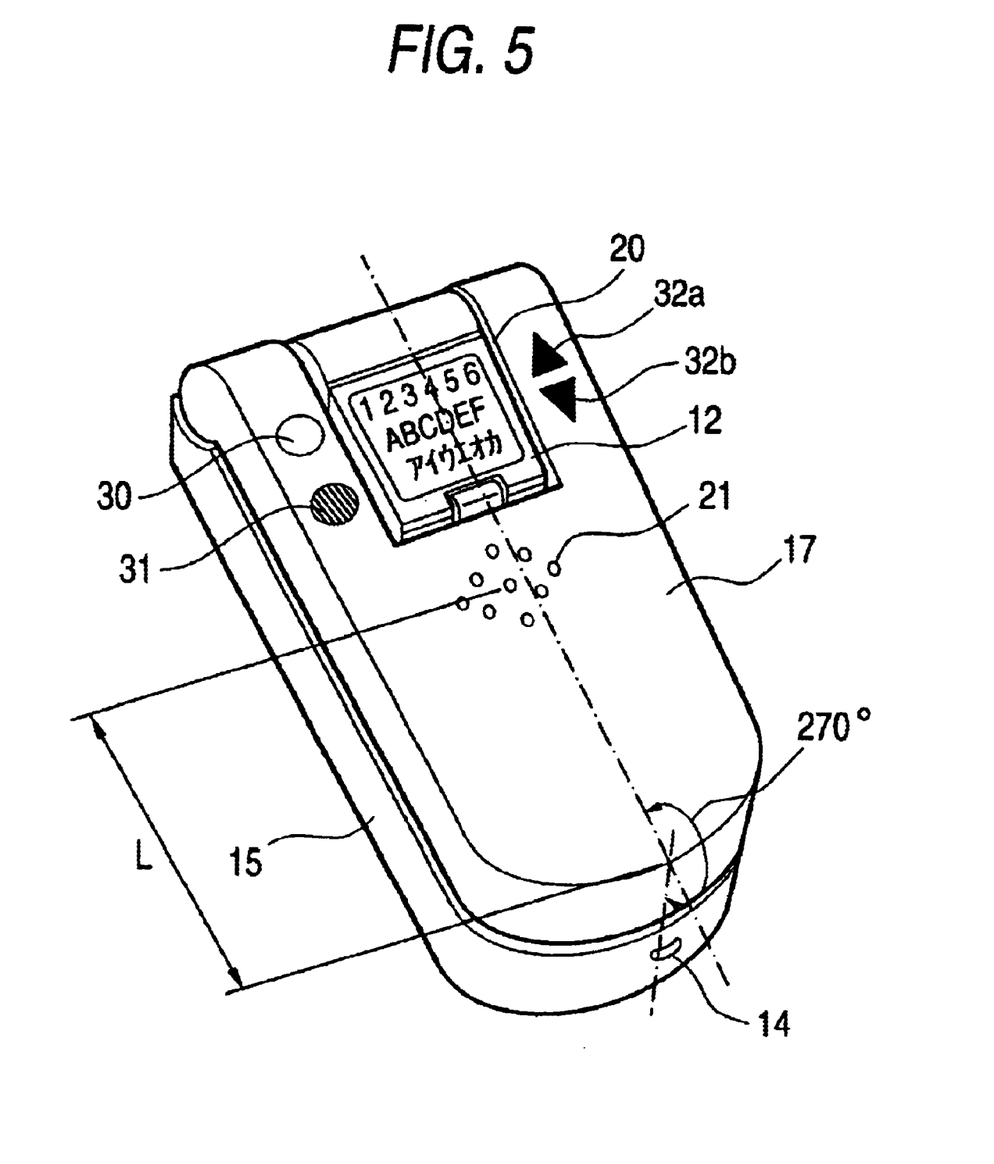
FIG. 5 is a perspective view showing the external appearance and construction of another example of a simple portable telephone set, which constitutes a second embodiment of the present invention.

FIG. 5 is a perspective view showing the external appearance and construction of another example of the simple portable telephone set with its lid held closed, which constitutes a second embodiment of the invention. In FIG. 5, parts corresponding functionally to those already described with reference to the first embodiment are therefore designated by the same reference numerals or characters. The second embodiment is similar to the first embodiment (shown in FIG. 3) except that a transmitting button 30, a hook switch 31, and a telephone directory retrieving keys 32a and 32b are provided, and that the sound generating section 21 is arranged at the position distanced by L from the transmitter section 14 (the sound generating section 21 and associated speaker 24 are located from the transmitter section 14 as far as possible), while the side surface of the telephone set body 15 where the transmitter section 14 is provided forms an obtuse angle of about 270° with respect to the upper surface of the lid 17 where the sound generating section 21 is provided.

Now, the functions of the second embodiment will be described.

First Function

The hook switch 31 is provided on the surface of the lid 17. Hence, in the case where, with the lid held closed, the telephone set receives a calling signal, the hook switch is turned to establish an off-hook condition, so that the user can talk over the telephone with the lid kept closed.

Second Function

In the case where the user makes the telephone call to the other party, the telephone directory retrieving key 32a or 32b is operated (depressed) to scroll the telephone directory to retrieve the aimed party's telephone number. Under this condition, the transmitting button 30 is depressed to transmits a calling signal to that party.

Third Function

The sound generating section 21 is located farthest from the transmitter section 14, and the side surface of the telephone set body 15 where the transmitter section is provided forms an obtuse angle of about 270° with respect to the upper surface of the lid 17 where the sound generating section 21 is provided. Hence, it is rather difficult for the sound of the sound generating section 21 to leak into the transmitter section 14.

As was described above, the second embodiment has the hook switch on the surface of the lid. Hence, in the case where the telephone set receives a calling signal, the hook switch is externally turned to provide an off-hook condition, so that with the lid kept closed the user can talk over the telephone. On the other hand, in the case where the user transmits a calling signal to the other party, the user scrolls the telephone directory with the telephone directory retrieving keys to obtain the telephone number of the aimed party, and he depresses the transmitting button to transmit a calling signal to that party. Furthermore, the sound generating section is located farthest from the transmitter section, and the side surface of the telephone set body 15 where the transmitters section is provided forms an obtuse angle of about 270° with respect to the upper surface of the lid where the sound generating section is provided, so that it is rather difficult for the sound of the sound generating section to leak into the transmitter section.

EFFECTS OF THE INVENTION

As is apparent from the above description, according to the invention, the sound of the second party is outputted through the sound generating section formed in the outer surface of the lid, and the sound of the user is inputted through the transmitter section. Therefore, with the lid held closed, the user can talk over the telephone with the other party. That is, he can talk over the telephone without holding the telephone set body.

What is claimed is:

1. A simple portable telephone set comprising:
   a telephone set body having a key operating section disposed on a major surface thereof;
   a liquid crystal section provided in said telephone set body;
   a transmitter section including a microphone and a microphone aperture, said microphone being located within said telephone set body, and said microphone aperture being provided on a side surface of said telephone set body, said side surface being transversely oriented relative to said major surface;
   an opening and closing lid swingably coupled to said telephone set body so as to overly said key operating section when closed and to reveal said key operating section when opened;
   a receiver section including a speaker, said receiver section being provided on an inner surface of said lid; and
   a sound generating section including a second speaker, said sound generating section being provided on an outer surface of said lid.

2. A simple portable telephone set as claimed in claim 1, wherein said lid has a window through which said liquid crystal section is viewed when said lid is closed.

3. A simple portable telephone set as claimed in claim 1, wherein said lid has a hook switch that is disposed on the outer surface of said lid.

4. A simple portable telephone set as claimed in claim 1, wherein said lid has telephone directory retrieving keys and a transmitting keys said retrieving and transmitting keys being disposed on the outer surface of said lid.

5. A simple portable telephone set as claimed in any one of claims 1 to 4, wherein said liquid crystal section is swingably coupled to said telephone set body and is movable relative to said set body independent of movement of said lid.

6. A simple portable telephone set as claimed in any one of claims 1 to 4, wherein, when said lid is closed, said sound generating section is located a first distance from said transmitter section and said receiver section is located a second distance from said transmitter section, said first distance being greater than said second distance.

7. A simple portable telephone set according to claim 1, wherein said microphone is in acoustic communication with an exterior of said telephone set body.

8. A simple portable telephone set comprising:
   a telephone set body having a key operating section disposed on a major surface thereof;
   a liquid crystal section to said telephone set body;
   a transmitter section including a microphone and a microphone aperture, said microphone being located within said telephone set body, and said microphone aperture being provided on a surface of said telephone set body that is transversely oriented relative to said major surface;
   an opening and closing lid swingably coupled to said telephone set body so as to overlay said key operating section when closed and to reveal said key operating section when opened;
   a receiver section including a speaker, said receiver section being provided on an inner surface of said lid; and
   a window, formed through said lid, wherein said liquid crystal section is viewed through said window when said lid is in said closed position.

9. A simple portable telephone set as claimed in claim 8, further comprising a sound generating section including a second speaker, said sound generating section being provided on an outer surface of said lid.

10. A simple portable telephone set as claimed in claim 7, wherein said liquid crystal section is swingably coupled to said telephone set body and is movable relative to said body independent of movement of said lid.

11. A simple portable telephone set according to claim 8, wherein said microphone is in acoustic communication with an exterior of said telephone set body.

12. A simple portable telephone set comprising:
    a telephone set body having a key operating section disposed on a major surface thereof;
    a liquid crystal section swingably coupled to said telephone set body and being movable relative to said body;
    a transmitter section including a microphone and a microphone aperture, said microphone located within said telephone set body, and said microphone aperture being provided on a surface of said telephone set body that is transversely oriented relative to said major surface;
    a lid that is swingably coupled to the said body, said lid being movable relative to said body and independently movable relative to said liquid crystal section; and
    a receiver section including a speaker.

13. A simple portable telephone set as claimed in claim 12, wherein said receiver section is provided on an inner surface of said lid.

14. A simple portable telephone set as claimed in claim 13, further comprising:
    a sound generating section including a second speaker, said sound generating section being provided on an outer surface of said lid.

15. A simple portable telephone set as claimed in claim 14, further comprising:
    a window that is formed through said lid and through which said liquid crystal section is visible when said lid is closed.

16. A simple portable telephone set according to claim 12, wherein said microphone is in acoustic communication with an exterior of said telephone set body.

17. A simple portable telephone set comprising:
    a telephone set body having a key operating section;
    an opening and closing lid swingably coupled to said telephone set body;
    a liquid crystal section that is visible on an outer surface of said lid when said lid is closed;
    a transmitter section including a microphone provided on said telephone set body;
    a receiver section including a speaker;
    a sound generating section including a second speaker provided on said outer surface of said lid; and
    telephone directory retrieving keys and a transmitting key, said retrieving and transmitting keys being disposed on the outer surface of said lid and being available when said lid is closed.

18. A simple portable telephone set comprising:
    a telephone set body having a key operating section;
    an opening and closing lid swingably coupled to said telephone set body and movable between a closed position wherein said key operating section is covered and a open position wherein said key operating section is revealed;

a liquid crystal display section;

a transmitter section including a microphone provided said telephone set body;

a receiver section including a speaker, said receiver section being provided on an outer surface of said lid; and a hook switch that is disposed on the outer surface of said lid and actuatable when said lid is closed.

* * * * *

UNITED STATES PATENT AND TRADEMARK OFFICE
CERTIFICATE OF CORRECTION

PATENT NO. : 6,731,959 B1  
DATED : May 4, 2004  
INVENTOR(S) : Masashi Kumagai et al.

It is certified that error appears in the above-identified patent and that said Letters Patent is hereby corrected as shown below:

Column 6,
Line 5, please delete "claim 7" and insert therefor -- claim 8 --.

Signed and Sealed this

Seventh Day of September, 2004

JON W. DUDAS  
*Director of the United States Patent and Trademark Office*